United States Patent
Mazyck et al.

(10) Patent No.: US 7,862,725 B2
(45) Date of Patent: Jan. 4, 2011

(54) METHOD FOR MERCURY CAPTURE FROM FLUID STREAMS

(75) Inventors: David W. Mazyck, Gainesville, FL (US); Chang-Yu Wu, Gainesville, FL (US); Erik R. Pitoniak, St. Louis, FL (US); Kevin W. Powers, Gainesville, FL (US); Danielle J. Londeree, Deerfield Beach, FL (US)

(73) Assignee: University of Florida Research Foundation Incorporated, Gainesville, FL (US)

( * ) Notice: Subject to any disclaimer, the term of this patent is extended or adjusted under 35 U.S.C. 154(b) by 607 days.

(21) Appl. No.: 10/522,589

(22) PCT Filed: Mar. 5, 2004

(86) PCT No.: PCT/US2004/006597
§ 371 (c)(1),
(2), (4) Date: Aug. 22, 2005

(87) PCT Pub. No.: WO2004/089501
PCT Pub. Date: Oct. 21, 2004

(65) Prior Publication Data
US 2006/0096926 A1    May 11, 2006

Related U.S. Application Data

(60) Provisional application No. 60/452,572, filed on Mar. 6, 2003.

(51) Int. Cl.
*C02F 1/28*     (2006.01)
*C02F 1/32*     (2006.01)
*C02F 1/72*     (2006.01)

(52) U.S. Cl. ............... 210/670; 210/688; 210/748.14; 210/763; 210/914

(58) Field of Classification Search ............... 210/688, 210/748, 763, 914, 670, 748.14; 502/236, 502/242; 588/309, 412; 95/134
See application file for complete search history.

(56) References Cited

U.S. PATENT DOCUMENTS

| | | | |
|---|---|---|---|
| 3,925,247 A | 12/1975 | Ogura et al. | |
| 4,786,483 A | 11/1988 | Audeh | |
| 4,946,596 A | 8/1990 | Furuta et al. | |
| 5,227,053 A * | 7/1993 | Brym | 210/748 |
| 5,501,801 A * | 3/1996 | Zhang et al. | 210/748 |
| 5,607,496 A * | 3/1997 | Brooks | 75/670 |
| 6,013,187 A | 1/2000 | Burns et al. | |

(Continued)

OTHER PUBLICATIONS

Database WPI Section Ch, Week 199214, Derwent Publications Ltd., (XP002393328).

(Continued)

*Primary Examiner*—Matthew O Savage
(74) *Attorney, Agent, or Firm*—Sughrue Mion, PLLC

(57) ABSTRACT

A method for removing mercury from a fluid stream includes the steps of providing a porous composite material comprising a substrate and a plurality of catalyst and/or photocatalyst particles, and contacting substrate with a fluid stream. The porous composite material adsorbs and/or then oxidizes or reduces metallic species including elemental mercury. A fossil fuel fired power plant can include an emission control device comprising the porous composite material to filter flue gas to and thereby minimize mercury emissions into the environment.

11 Claims, 7 Drawing Sheets

U.S. PATENT DOCUMENTS

| | | |
|---|---|---|
| 6,248,217 B1 | 6/2001 | Biswas et al. |
| 6,338,824 B1 | 1/2002 | Andresen et al. |
| 6,508,992 B1 | 1/2003 | Taoda et al. |
| 6,576,092 B2 | 6/2003 | Granite et al. |
| 6,632,771 B1 | 10/2003 | Maekawa et al. |
| 2003/0047440 A1 | 3/2003 | Granite et al. |

OTHER PUBLICATIONS

F-S Zhang et al., "Photocatalytic removal and recovery of mercury from water using $TiO_2$-modified sewage sludge carbon", Journal of Photochemistry and Photobiology, A: Chemistry, vol. 167, No. 2-3, Oct. 1, 2004, pp. 223-228.

* cited by examiner

METHOD FOR MERCURY CAPTURE FROM FLUID STREAMS

This application claims benefit under 35 U.S.C. § 119(e) to U.S. Provisional Application Ser. No. 60/452,572, filed Mar. 6, 2003, the disclosure of which is incorporated herein by reference.

STATEMENT REGARDING FEDERALLY SPONSORED RESEARCH OR DEVELOPMENT

The U.S. Government has certain rights to the invention based on Environmental Protection Agency Grant/Contract No. R-82960201 and National Aeronautics and Space Administration Grant/Contract No. NCC 9-110, both with the University of Florida.

BACKGROUND OF THE INVENTION

1. Field of the Invention

This invention is directed to methods and composite materials for purifying fluid streams. For example, fields of the invention include flue gases emitted from combustion sources (e.g., coal-fired power plants, waste-to-energy facilities, medicinal and similar incinerators, and industrial manufactures) and for purifying ground, surface, and/or industrially processed waters. More particularly, the invention relates to removal of mercury and other contaminants from a fluid stream by adsorption and either subsequent or continuous catalytic and photocatalytic oxidation using catalyst and photocatalyst impregnated or doped sorbents (e.g., silica-gels).

2. Description of the Related Prior Art

Mercury emission from combustion sources is a significant environmental concern. When mercury is released into the atmosphere, it can be transported by wind and then through direct deposition can accumulate in surface waters. In the water, biological processes can transform mercury (typically elemental mercury) into methylmercury, which is highly toxic and can bioaccumulate in fish. Therefore, preventing the release of mercury into the environment is very important.

The largest emitters of mercury are coal-fired electric utility plants, which account for an estimated more than 90% of all anthropogenic mercury emissions. Mercury is also listed as one of the 189 hazardous air pollutants (HAPs) in the 1990 Clean Air Act Amendments (CAAA). Regulations are being set for future emission standards for combustion sources to be implemented as early as 2007.

The unique feature of mercury emission that differs from other toxic metals results from mercury's $5d^{10}6s^2$ closed shell electronic structure that is isoelectronic to He ($1 s^2$), and is accordingly highly stable in its elemental state. As a result, unlike other toxic metals, the dominant form of mercury in combustion exhaust is elemental mercury ($Hg^0$) vapor, unless chlorine is present. Since $Hg^0$ is insoluble, gas removal devices, such as scrubbers, are also ineffective for its removal. Similarly, particulate removal devices (e.g., baghouses and electrostatic precipitators) are also highly ineffective.

In recent years, numerous studies for enhanced mercury removal from combustion sources have been undertaken. Generally the methods used in these studies were based on either adsorption or oxidation. Currently, the maximum available control technology (MACT) for mercury is powdered activated carbon injection. However, its predicted use is limited because of questionable costs, presently low capacity, low applicable temperature range, and problems associated with collection and regeneration of the carbon. This approach has been estimated to cost about $2-5 billion annually to implement in U.S. coal-fired power plants.

In addition to activated carbon, calcium-based sorbents such as hydrated lime have also been considered. However, calcium-based sorbents provide poor efficiency for mercury removal unless they are modified with fly ash. Studies have also been carried out using zeolite and bentonite, but they have demonstrated very low capacity for mercury.

The use of an advanced oxidation process has also been investigated for mercury removal. Heterogeneous photocatalysis is one such method that utilizes a semiconductor in the oxidation and mineralization of pollutants, either in the air phase or water phase. When the surface of the photocatalyst absorbs a specific amount of energy (usually a photon), an electron from the valence band is promoted to the conduction band, thereby leaving a positive charged "hole" in the valence band. Reactions with these electron-hole pairs result in the formation of hydroxyl radicals ($OH^-$), which are very reactive oxidizing species. Titanium dioxide ($TiO_2$) is one such semiconductor/catalyst that can be activated when irradiated by UV light.

Wu et al. (*Env. Eng. Sci.* 1998;15(2):137-148) and Lee et al. (*AIChE J* 2001;47:954-961) used $TiO_2$ nano-aerosols generated in-situ in combustion systems to effectively transform elemental mercury into mercuric oxide. This process was reported to have high efficiency, but a major limitation related to separation and regeneration of the mercuric oxide-loaded $TiO_2$ aerosols.

Therefore, an economical solution that can more efficiently capture mercury compared to the technologies discussed above offers the potential to significantly decrease the estimated costs to meet pending regulations. In addition, the solution should be engineered such that it could be easily implemented in existing coal-fired power plants and similar installations. Not to be bound by theory, but a viable location for the technology derived herein would be to insert the technology between the electrostatic precipitator or baghouse and the effluent stack for coal-fired power plants, although the technology is not limited to this location. In addition, it is conceivable to micronize (create a fine powder with diameters less than 45 µm) and inject the material in to a flue duct.

SUMMARY OF THE INVENTION

In accordance with the present invention, there is provided a method and composite for removing mercury from a fluid stream, the method including the steps of contacting a composite material comprising a substrate and catalyst particles with a fluid stream. The composite material adsorbs and oxidizes the mercury.

Preferably, the catalyst particles are located on the substrate surface and/or contained in the substrate. The composite material may be a sorbent and, if so, is preferably a gel, more preferably, a xerogel.

The method of the invention preferably includes the step of irradiating the composite material with radiation, preferably radiation having a wavelength of from about 160 to about 680 nm. The substrate is preferably transparent to radiation and, for example, may be porous silica, and the catalyst may comprise $TiO_2$. Preferably, the sorbent is a material having a surface area (BET) of about 1 to about 1500 $m^2/g$, preferably about 200 to about 900 $m^2/g$. The catalyst is preferably present in the composite material in an amount of from about 0.1 wt % to about 100 wt %.

The method of the present invention also preferably comprises the step of regenerating the composite. The regeneration may be either chemical or thermal regeneration.

The present invention also relates to a composite, the composite including a sorbent and mercuric oxide and preferably further including a catalyst. If a catalyst is present, it may be present in an amount of about 0.1 wt % to about 100 wt %. The catalyst is preferably a photocatalyst, more preferably, $TiO_2$. The sorbent is preferably a gel, more preferably, a xerogel. The sorbent is preferably silica, and preferably has a surface area (BET) of from about 1 to about 1500 m$^2$/g, preferably about 200 to about 900 m$^2$/g. The composite preferably contains the mercuric oxide in an amount of from about 0.1 wt % to about 100 wt %, more preferably about 0.1 wt % to about 10 wt %.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Figure 1:
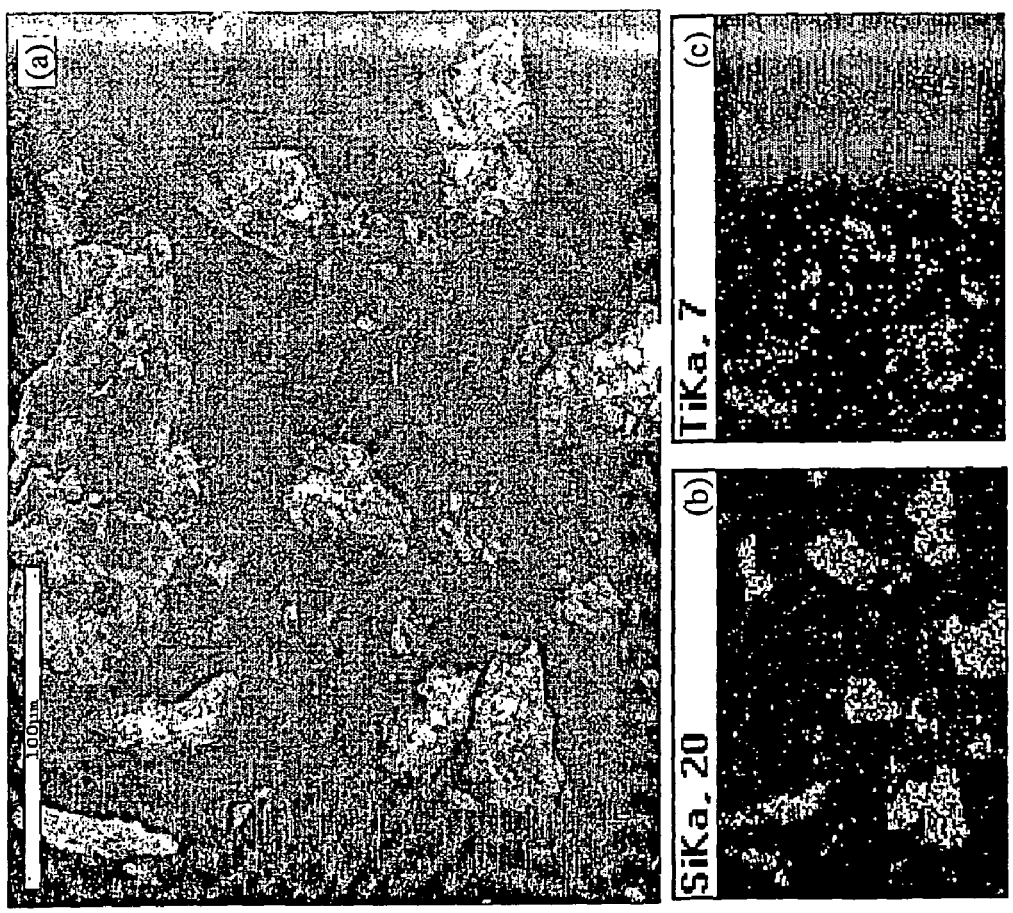
FIG. 1 (a)-(c) illustrate scanning electron microscope (SEM) and energy dispersive spectrometry (EDS) analyses of crushed composite pellets including a SEM image, Si mapping and Ti mapping, respectively.

The invention includes a new method and composite that can remove mercury from a fluid stream. Specifically, the invention is targeted to remove mercury via adsorption and/or either simultaneous or subsequent oxidation. Adsorption on the composite material allows mercury to be concentrated while exposure to radiation ensures the oxidation of the adsorbate(s). Intermittent UV light exposure can be used with the invention which minimizes energy consumption of the process if so desired. High efficiency, large capacity and the ability to recover mercury are advantageous features of the invention.

As used herein, the term "mercury" refers to all forms of mercury including oxidized states (e.g., HgO, HgCl, $HgCl_2$) and elemental mercury ($Hg^0$). As used herein, the term, "impregnated" refers to the incorporation of a material (e.g., a photocatalyst) within the porous network of a sorbent, and may be either attached to the surface of the pores and/or a part of the crystalline network. Also, as used herein, the term "doping" refers to the addition of a material such that it is fixed to the sorbent internal or external surface and is accessible to the fluid stream. Further, as used herein, the term "sorbent" refers to an amorphous or crystalline solid that is capable of accumulating contaminants on or within the porous network of the sorbent.

The porous composite material preferably consists of a high surface area substrate material. For example, a silica-gel impregnated with photocatalyst particles, such as $TiO_2$; herein referred as a "$SiO_2$—$TiO_2$ composite gel". The $SiO_2$—$TiO_2$ composite gel can provide a surface area of about a few m$^2$/g to 1500 m$^2$/g. The gel is preferably a xerogel, defined as a gel that is obtained by evaporation of the liquid component at ambient pressure and temperatures below the critical temperature of the liquid. However, other gel forms may be used with the invention. Other suitable substrates include activated carbon, ceramics, metal silicates, alumina, zeolites, and the like as well as nonporous substrates such as silica/glass beads, stainless steel, and the like.

The mercury deposited on the composite following irradiation has been identified as mercuric oxide. Very high Hg removal efficiency (at least about 99%) can be achieved with continuous irradiation. It has also been observed that photocatalytic oxidation "activates" the adsorbent, thus enhancing the subsequent adsorption capacity of the composite material when UV irradiation is not applied.

The capacity of the porous composite material can be further increased by optimizing the mass transfer of mercury from the bulk fluid phase to the adsorption sites. For example, one could manipulate the gels pore size distribution or decrease the pellet size from the current 5×3 mm size tested herein. If desired, by rinsing the composite pellets with a suitable acid, such as $H_2SO_4$ and/or $HNO_3$, adsorbed mercury can be separated from the pellets that permit the adsorption sites on the composite to be regenerated. More efficient regeneration might be obtained by thermal treatment of the mercury at elevated temperatures such as about 200° F. to about 1000° F.

Photocatalyst particle (e.g. $TiO_2$) loading at all levels has been found to enhance mercury removal. Optimal loading is a function of sorbent porosity, surface area, transparency to UV light, permeability, adsorption characteristics, granular size, and other physical and chemical characteristics. In the preferred embodiment a TiO2 loading of between 10 and 13 wt % has been shown to give optimum performance.

In a preferred embodiment, the $SiO_2$—$TiO_2$ composite gel is formed using a sol-gel method. However, other methods to form the composite will be apparent to those skilled in the art. The basic formula uses specific volumetric ratios of various acids, water, silica alkoxide (silica precursor) or sodium silicate, with or without, various cosolvents. During formulation, during gelation, or post gelation the silica is doped, for example, with a commercially available photocatalyst, such as titanium dioxide. Preferably, the titania percentage varies from about 0.5% to about 15% on a wt/wt basis, but $TiO_2$ loadings up to 100 wt % can be incorporated. Mixed alkoxide synthesis can also be used to form a composite gel of $SiO_2$ and $TiO_2$ with a more homogeneous distribution of $TiO_2$. Various synthesis and aging steps can produce composites with pore sizes ranging from <10 angstroms to >50 nm or as large as desired. Preferably, the pore sizes are greater than about 30 angstroms and less than about 320 angstroms, more preferably between about 60 and 200 angstroms, and most preferably between about 100 and 140 angstroms. In addition, surface treatments can be used to enhance Hg adsorption. When the solution becomes viscous during the gelation step, it may then be transferred into a mold in order to create a pellet of a desired size. After gelation, the composite may then be aged for varying lengths of time to increase its strength. After aging, the pellets may then be removed from their mold, rinsed with water, and then placed in another container for additional heat treatments. In the preferred embodiment, the pellets are placed in an oven and the temperature may then be ramped from room temperature to 103° C. and kept constant for 18 hours, resulting in vaporization of the liquid within the porous silica matrix to form a xerogel. The temperature may then be ramped to 180° C. and kept constant for 6 hours. Additional curing at higher temperatures can also be achieved (up to 600° C.) for strengthening of the gel. The resultant average pore size of the gel can range from a pore size of about 30 angstroms to a pore size of between about 100 to about 200 angstroms, depending on the initial formula. The pellets can then be used in a packed-column.

This indicates only one exemplary composite formulation. A wide variety of formulations, catalysts, aging and drying parameters can be used to derive the optimum pore size, pellet/particle size, surface area, surface adsorption characteristics, reduction efficiency, permeability, temperature stability and regeneration characteristics. Alternatively, the sorbent can be synthesized in bulk and crushed or ground and screened to produce granular particles of the optimum size range for various applications.

A significant difference between the composites described herein and other composites for mercury removal is the use of a UV transparent substrate material such as silica. Porous silica is a good adsorbent medium that is also substantially optically transparent to UV light, which allows the penetration of UV light through its matrix to activate the intermixed photocatalyst particles, such as titanium dioxide. Preferably, the photocatalyst particles are provided both on the surface of and within the silica matrix allowing oxidation to occur on both external and internal surfaces within the porous silica structure.

A wide variety of photocatalysts can be used with the invention. The sol-gel process is not limited to the use of titanium dioxide, but other catalysts such as HgO, ZnO, $V_2O$, $SnO_2$ or even modified $TiO_2$ catalysts coated with platinum or other conductive materials can also be used. In addition, the composites can be made into any shape convenient for use, such as spheres, cylinders, or other shapes.

EXAMPLES

The present invention is further illustrated by the following examples which include demonstrations of the superior performance of the advanced porous composite material for elemental mercury removal. The examples are provided for illustration only and are not to be construed as limiting the scope or content of the invention in any way.

Example 1

Synthesis of Silica-Titania Composite

The silica-titania composites were made by a sol-gel method using nitric acid and hydrofluoric acid as catalysts to increase the hydrolysis and condensation rates, thereby decreasing the gelation time. The basic formula used to create gels with a pore size of roughly 150 Å is as follows: 25 mL water, 50 mL ethanol, 35 mL TEOS (tetraethylorthosilicate), 4 mL nitric acid (1N), and 4 mL HF (3%). Of course, one of ordinary skill in the art will recognize that silicon alkoxides, sodium silicate, colloidal silicas, slip casting or traditional ceramic techniques are suitable for use with the invention.

The chemicals were reagent grade and were added individually, in no particular order, to a polymethylpentene container. During this time, a known mass of Degussa (Dusseldorf, Germany) P25 $TiO_2$ was added to the batch and the percentage of titania recorded is given as a percent by weight of silica. A magnetic stir plate provided sufficient mixing, but care should be used to insure that the $TiO_2$ is well dispersed in the sol and that the homogeneous distribution of $TiO_2$ is maintained throughout the gelation process. Accordingly, the catalyst particles are homogeneously dispersed both in solid portions of the substrate and on surface portions of the substrate. The solution (including the P25) was pipeted into polystyrene 96-well assay plates before complete gelation. The volume added to each well was approximately 0.3 ml. After gelation, the plates were then covered with lids and wrapped in foil to prevent premature evaporation. Next, the sample was aged at room temperature for two days, then at 65° C. for two days.

After aging, the pellets were removed from the container, rinsed with deionized water to remove any residual acid or ethanol, and placed in a Teflon container for the next series of heat treatments. A small hole in the lid of the container allowed slow and uniform drying of the gel. The pellets were then placed in an oven and the temperature was ramped from room temperature to 103° C. (2°/min) and kept constant for 18 hours, resulting in the vaporization of liquid solution within the silica network. Next, the temperature was ramped to 180° C. (2°/min) for removal of physically adsorbed water and hardening of the gel, where it was kept constant for 6 hours and then was slowly decreased back to room temperature over a 90 minute period. The resultant size of an individual cylindrical pellet after drying was approximately 5 mm in length with a diameter of 3 mm.

The BET (Brunauer, Emmett, and Teller equation) surface area and pore volume analyses were performed on a Quantachrome NOVA 1200 Gas Sorption Analyzer (Boynton Beach, Fla.). The samples were outgassed at 110° C. for approximately 24 hours and analyzed using nitrogen adsorption. The average pore size was calculated from the total pore volume and the surface area. Pore size distribution curves were also attained to provide additional information on pore morphology. Scanning Electron Microscopy (SEM) (JSM-6400, JEOL USA, Inc.) with Energy Dispersive Spectroscopy (EDS) detector (Tracor System II, Oxford Instruments, Inc.) was used for morphology and surface elemental analysis. The silica-titania gel composites had specific surface areas on the order of 200 to 300 $m^2/g$, pore volumes around 1 cc/g, and average pore diameters of about 150 angstroms. The synthesized pellets had a white color due to the presence of $TiO_2$. The addition of $TiO_2$ in the range studied did not seem to significantly affect the surface area. The pore volume within the loading range was roughly 1.0 cc/g and had negligible differences among the various pellets. Concerning pore size, the average pore diameter (pore volume/surface area) averaged 150 angstroms. The SEM image of crushed fresh pellet (13 wt % loading) is shown in FIG. 1(a). The corresponding EDS elemental mappings of Si and Ti are shown in FIG. 1(b) and FIG. 1(c), respectively. FIG. 1(c) shows $TiO_2$ was well distributed in the $SiO_2$ matrix although some agglomerated $TiO_2$ can also be seen.

Example 2

Mercury Removal Characterization/Methodology

Figure 2:
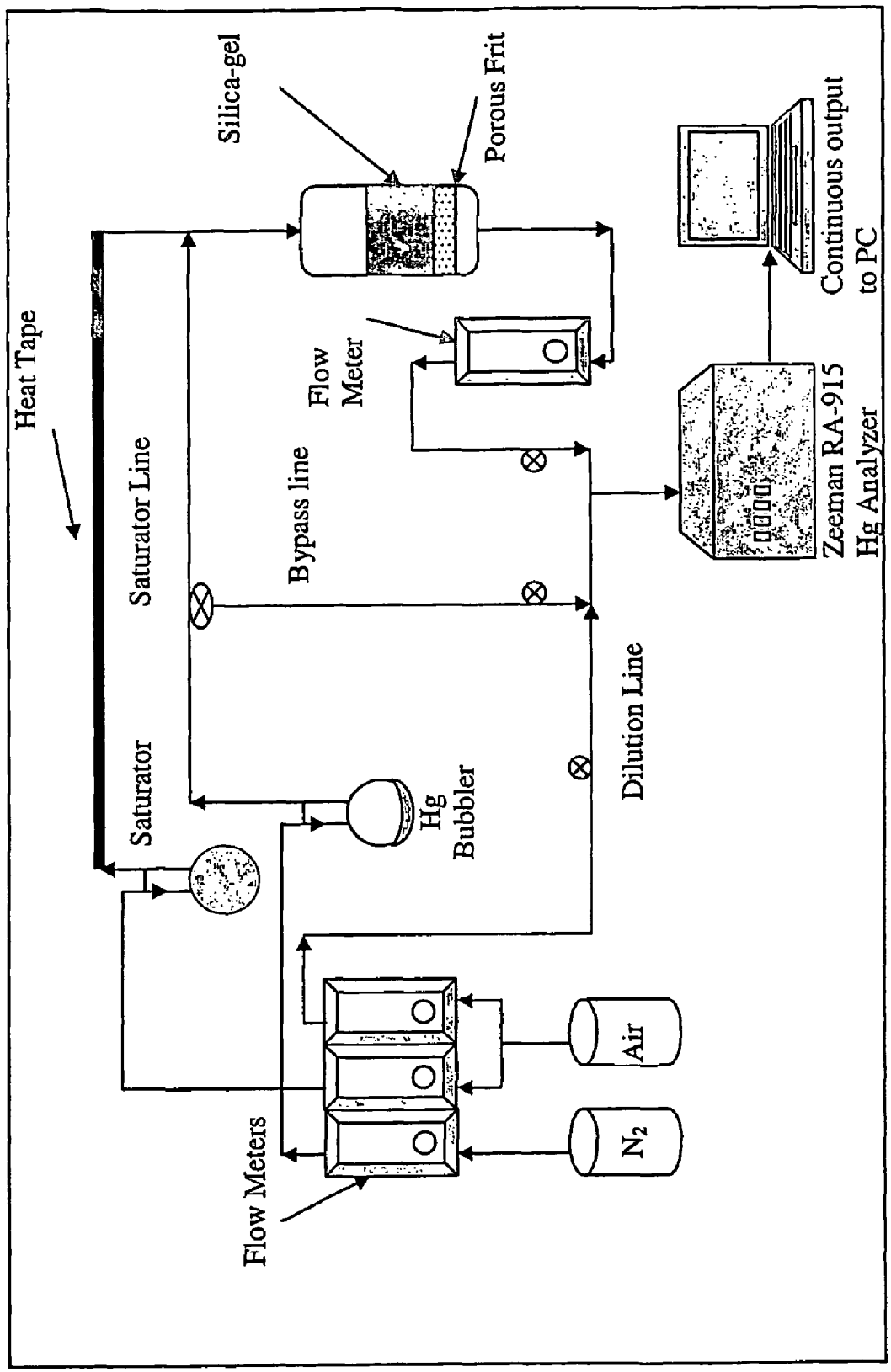
FIG. 2 illustrates a schematic of an exemplary photocatalytic adsorption packed bed reactor based system for mercury vapor removal equipped with a source of mercury vapor and an analyzer for measuring mercury concentrations.

Silica-Titania Composite Gel formed using the synthesis method described above was tested in a packed bed reactor system to characterize the mechanisms and efficiency for mercury vapor removal. The reactor system including a supply of mercury vapor and a Hg analyzer is shown in FIG. 2. The flow-rate of mercury-laden air was 0.67 liters/min with a residence time in the reactor of 0.29 seconds. The initial mercury concentration for experiments ranged from 7 to 150 ppb. Mercury vapor laden air was introduced into the system by passing purified air above liquid mercury held in a reservoir. To study the effects of moisture on the system, water vapor was introduced by bubbling water using purified air. The mercury concentration of the mixture was measured by a UV mercury analyzer (VM 3000, Mercury Instruments or Zeeman RA-915 mercury analyzer). The air carrying the designated level of mercury concentration and humidity flowed downward through the packed-bed reactor from the top in order to minimize the chance of selective flow or channeling through the reactor.

A stainless steel mesh (64 um opening) was used to hold the pellets. A UV lamp (4W) was placed at the center of the packced-bed reactor, and the pellets were randomly packed around the lamp. Between 5 and 10 grams of pellets were used in the experiments. The cross-sectional area of the reactor was 26.5 cm². After flowing through the reactor, dilution air was introduced to dilute the mercury concentration to the appropriate range for measurement. The air was then passed through a carbon trap before it was exhausted into a hood while a slit of the air was directed to the mercury analyzer for measurement. Purge air was used to flush mercury out of the system after each experiment.

After the experiment, the composite pellet was analyzed by BET again to examine if there was any significant change in surface area. The amount of total mercury adsorbed on pellets was determined following a hot acid digestion ($HNO_3:H_2SO_4$ mixture; 7:3) of 25 mg of pellets/10 ml of solution. Samples were brought to a refluxing boil on a hot plate for 4 hours. After cooling, 0.1 ml of concentrated HCl was added to the samples, and the final volume adjusted to 50 ml by dilution with Nanopure® water. Mercury concentration was then measured by Inductively Coupled Plasma spectroscopy (ICP) to determine the capacity.

Example 3

Mercury Removal Rate as a Function of Adsorption and Oxidation

Figure 3:
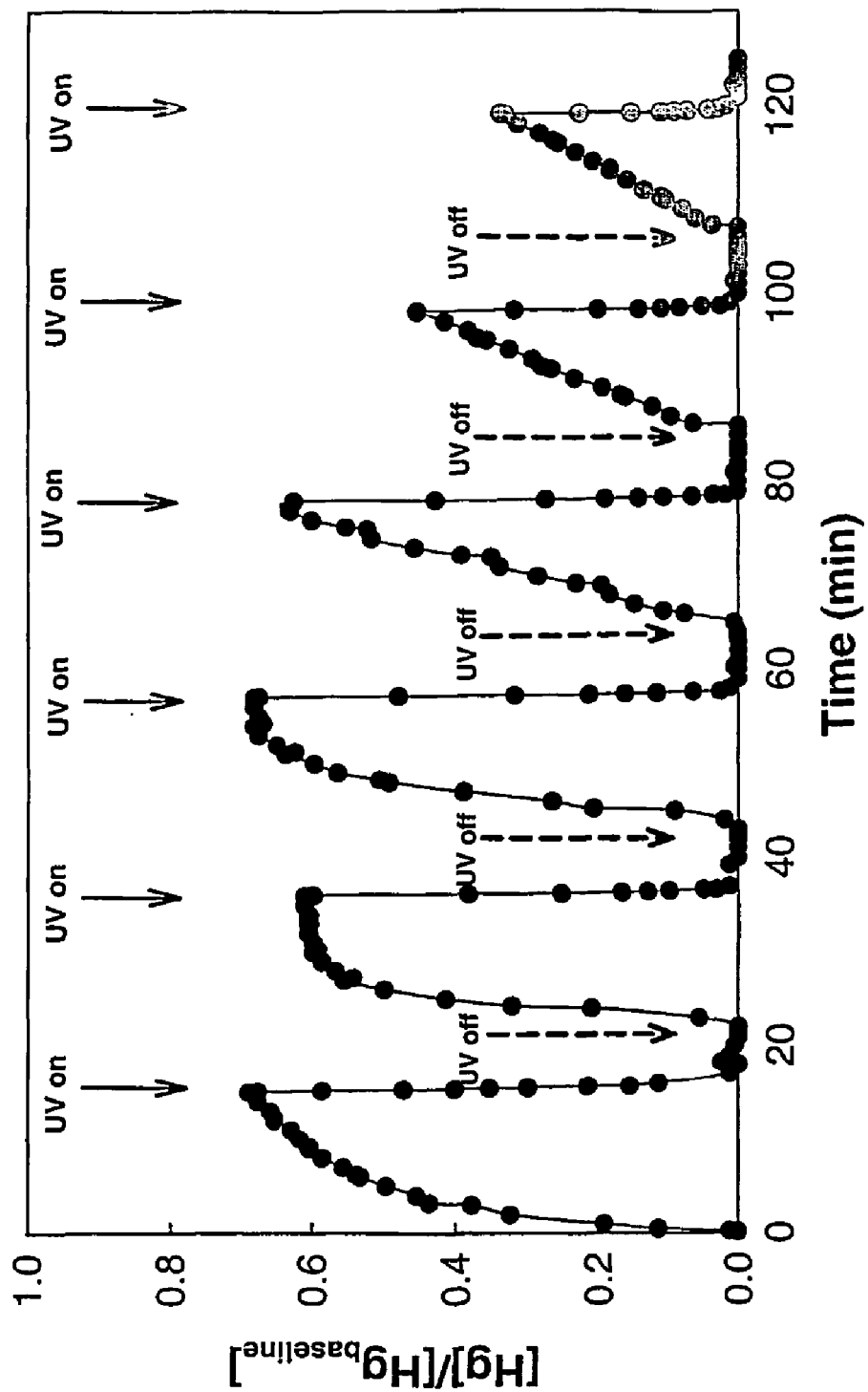
FIG. 3 illustrates dimensionless outlet mercury concentration (C/Co) as a function of time (13 wt % $TiO_2$ loading, relative humidity of 70% and residence time of 0.29 sec).

FIG. 3 shows the dimensionless outlet mercury concentration ($C/C_o$) for the UV on/off cycles as a function of time. The inlet concentration was regularly checked to ensure it stayed at the designated level. As shown, the outlet concentration in the first cycle increased to 68% after 15 minutes, proving that the high surface area silica gel was capable of adsorbing mercury. The breakthrough time was short due to the small bed height used, but it can be easily made larger by using a longer bed.

After 15 minutes of adsorption, the UV-light was turned on. The outlet concentration quickly dropped down to 0% in less than 2 minutes, demonstrating highly effective photocatalytic oxidation. During this oxidation period, effluent mercury stayed at this low level. After 6 minutes of UV exposure, the UV light was turned off to start the second cycle. The outlet concentration remained at a low concentration for a short period of time and then increased in a similar pattern observed in the previous cycle. Comparison of the end of the first cycle before the UV light was turned on and the beginning of the second cycle indicates that photocatalysis oxidized the previously adsorbed mercury and "reactivated" the silica gel. Otherwise, the mercury concentration initially measured in the second cycle would be the final level detected from the previous cycle (i.e. 68%).

The other unexpected phenomenon demonstrated was that oxidation cycles improved adsorption for the next cycle. In other words, by comparing the mercury outlet concentrations of the respective cycles, a decreasing trend was observed.

In a related experiment, the time to reach 20% exhaustion (i.e., 20% of the sorbent's capacity utilized) for each cycle for 10 grams of pellets was measured. As can be seen from Table 1, the pellets performed better with each successive cycle.

TABLE 1

Time for Reaching 20% Exhaustion by Adsorption in the Various Cycles

| | Cycle No. | | | | | |
|---|---|---|---|---|---|---|
| | 1 | 2 | 3 | 4 | 5 | 6 |
| Time (min) | 1 | 2.1 | 3.2 | 6 | 7.2 | 9.3 |

Thus, Table 1 clearly shows the increase in time with each cycle to reach 20% exhaustion (e.g. 1 min in the first cycle and 2.1 minutes in the second cycle). This breakthrough profile became stable after a few cycles.

Example 4

$TiO_2$ Loading

Figure 4:
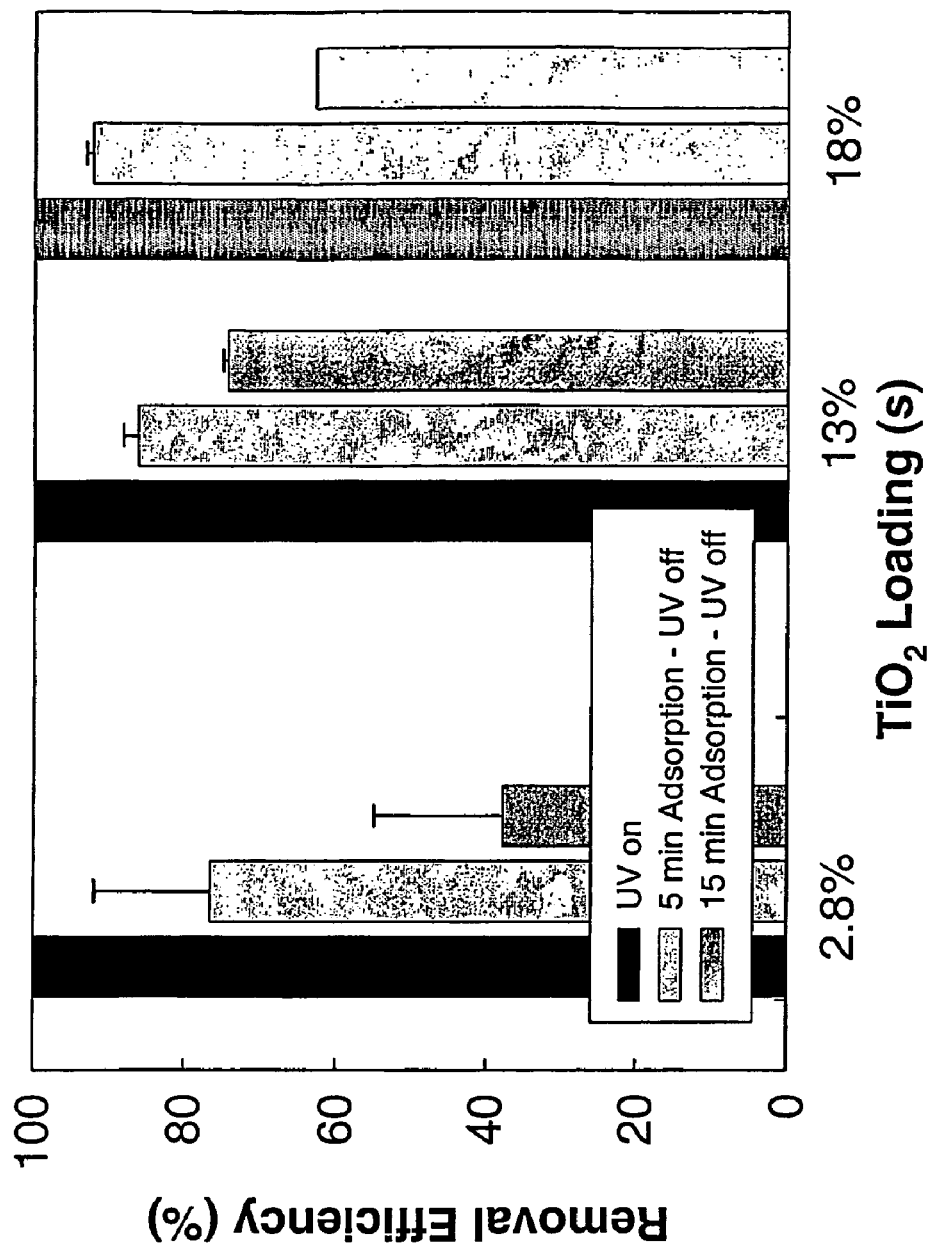
FIG. 4 illustrates mercury removal efficiencies for various $TiO_2$ loadings (15% relative humidity, 0.35 sec residence time).

An increase in $TiO_2$ loading to a certain extent is expected to yield higher mercury removal efficiencies by providing more active sites for photocatalytic oxidation. However, higher loadings (i.e., greater wt % ratio) may interfere with the adsorption or hinder UV transparency, therefore reducing the effectiveness. Measured efficiencies for various $TiO_2$ loadings are shown in FIG. 4. The efficiencies of photocatalytic oxidation, adsorption at 5 minutes and at 15 minutes are both reported.

When the UV light was on, mercury removal was 100%. In looking at adsorption, the 2.8% impregnated silica-gel clearly had a lower capacity than the other two loadings. This deficiency may be due to the photocatalytic "activation" discussed in the previous section. The 2.8% $TiO_2$ loading may not be enough to provide the necessary OH radicals for activation, thus resulting in a lower adsorption capacity. Comparing the 13% and 18% data, the 13% provided a slightly better performance but the difference did not appear to be significant.

For optimum system performance, $TiO_2$ particles should be dispersed. Agglomeration appears to yield less effective use of $TiO_2$ for this purpose. The experimental results suggest that 13% loading to be the optimal based on the current doping methodology.

Example 5

Residence Time

Figure 5:
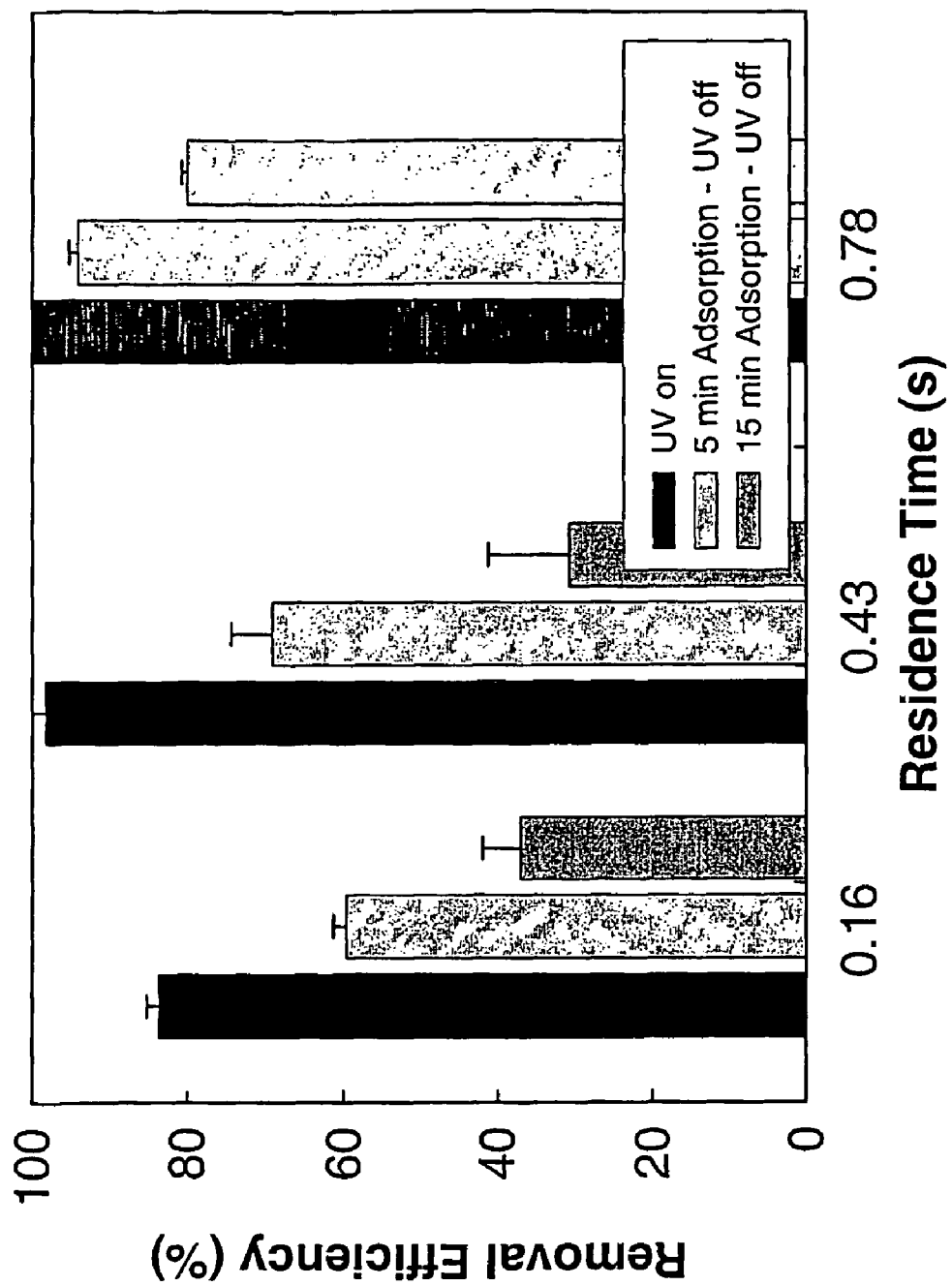
FIG. 5 illustrates mercury removal efficiencies for various residence times (13 wt % $TiO_2$, 70% relative humidity).

Flow rate is another important operating parameter that generally determines the mercury removal efficiency in the system. The flow rate controls the residence time of the mercury containing gas in the reactor and therefore the effectiveness of adsorption and reaction can me impacted. In addition, by varying the flow rate, the rate limiting mechanism can be identified. The removal efficiency as a function of residence time is shown in FIG. 5.

As the residence time decreased from 0.78 to 0.16 s, adsorption was greatly impacted. The removal efficiency drastically decreased when the residence time decreased. Compared to adsorption, the removal efficiency by photocatalytic oxidation only decreased slightly, although it was much more affected at the smallest residence time. While short residence time reduces the performance of the system regardless of whether adsorption or oxidation is the main removal mechanism, the results clearly indicate that adsorption is the rate limiting factor.

Example 6

Continuous UV Versus Cyclic Operation

Figure 6:
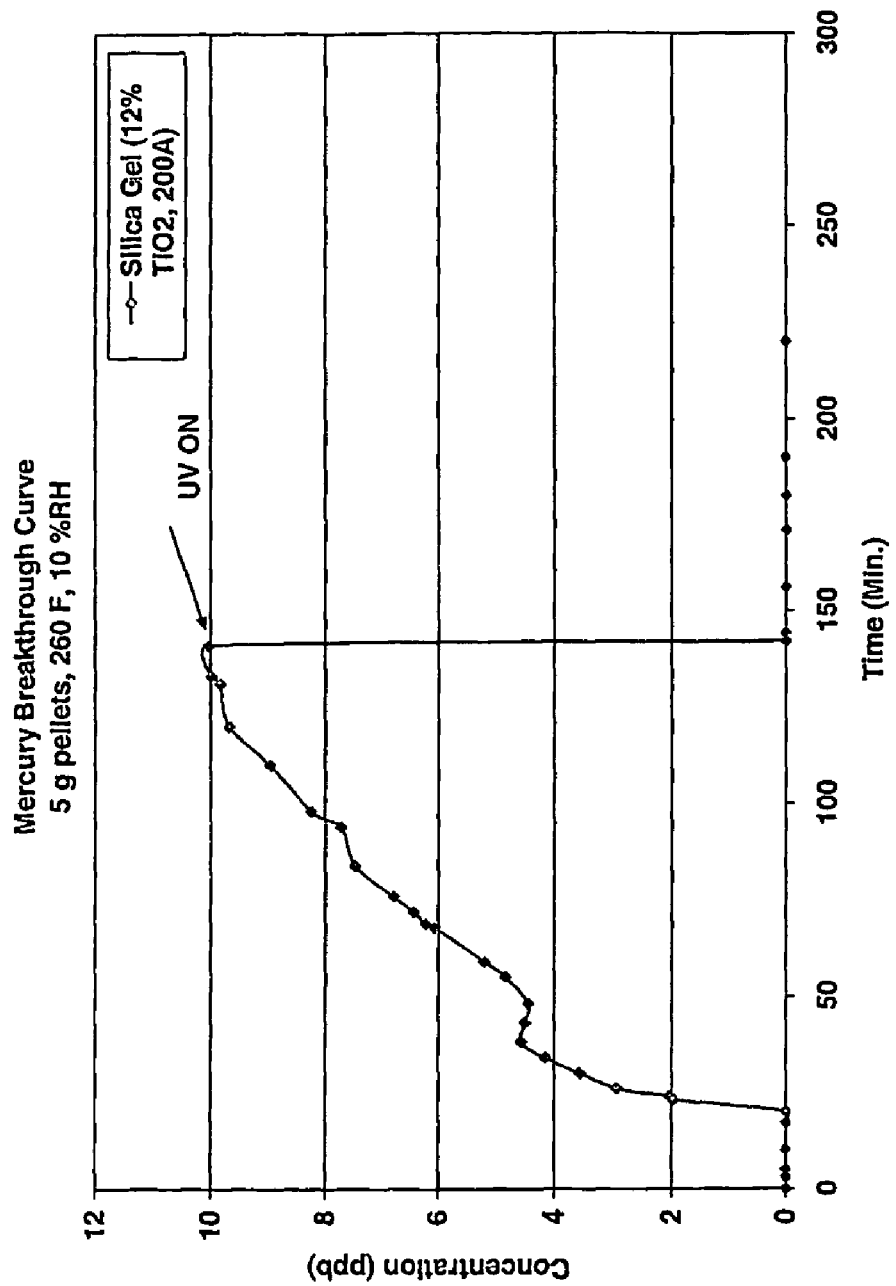
FIG. 6 illustrates mercury removal by adsorption alone and then removal by adsorption and irradiation (10% relative humidity, 12 wt % $TiO_2$ loading)
Figure 7:
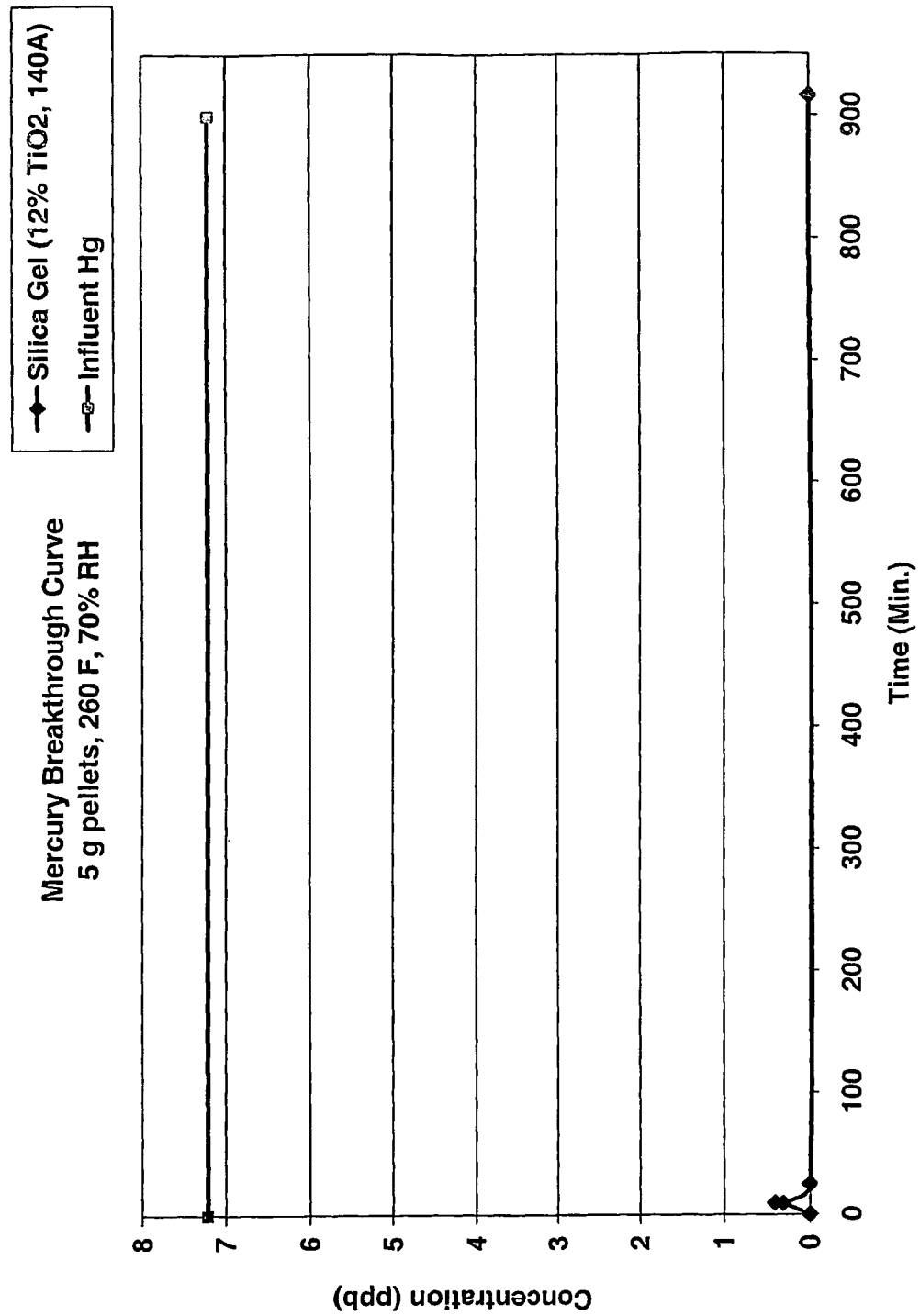
FIG. 7 illustrates mercury removal via simultaneous adsorption and UV irradiation (70% relative humidity, 12 wt % $TiO_2$ loading)

An alternative to exposing the silica-gels to intermittent UV is to maintain an environment of constant irradiation. FIG. 6 demonstrates that once UV was applied to the system, the effluent mercury concentration returned to zero and remained there for the duration of the experiment. Similarly, FIG. 7 demonstrates that if the system is irradiated from the beginning, other than the fluctuation in effluent mercury concentration in the beginning of the experiment, the effluent concentration remained at zero for the duration of the experiment. Similar experiments were carried out for almost 500 hours with the same results. Furthermore, silica impregnated with HgO with and without $TiO_2$ performed similarly in the presence and absence of UV light.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

What is claimed is:

1. A method for removing mercury from a fluid stream, comprising the steps of:

providing a composite material comprising a substrate and catalyst particles; and contacting a fluid stream with said composite, wherein said composite adsorbs said mercury, wherein the catalyst particles are homogeneously dispersed both in solid portions of the substrate and on surface portions the substrate, the substrate is silica-gel, and the catalyst is selected from any one of $TiO_2$, HgO, ZnO, $V_2O_5$, $SnO_2$, modified $TiO_2$ coated with Pt or other conductive materials.

2. The method of claim 1 wherein said silica gel is an xerogel.

3. The method of claim 1, further comprising the step of oxidizing said mercury adsorbed on said composite by irradiating said composite material with radiation.

4. The method of claim 3, wherein said radiation has a wavelength of from about 160 to about 680 nm.

5. The method of claim 1, wherein said substrate is transparent to radiation.

6. The method of claim 5, wherein said substrate comprises porous silica gel.

7. The method of claim 6, wherein said catalyst comprises $TiO_2$.

8. The method of claim 1, wherein said substrate has a surface area (BET) of about 1 to about 1500 $m^2/g$.

9. The method of claim 1, wherein said catalyst is present in said composite material in an amount of from about 0.1 to about 100 wt%.

10. The method of claim 1, further comprising the step of regenerating the composite.

11. The method of claim 10, wherein said regeneration step comprises chemical or thermal regeneration.

\* \* \* \* \*